UNITED STATES PATENT OFFICE.

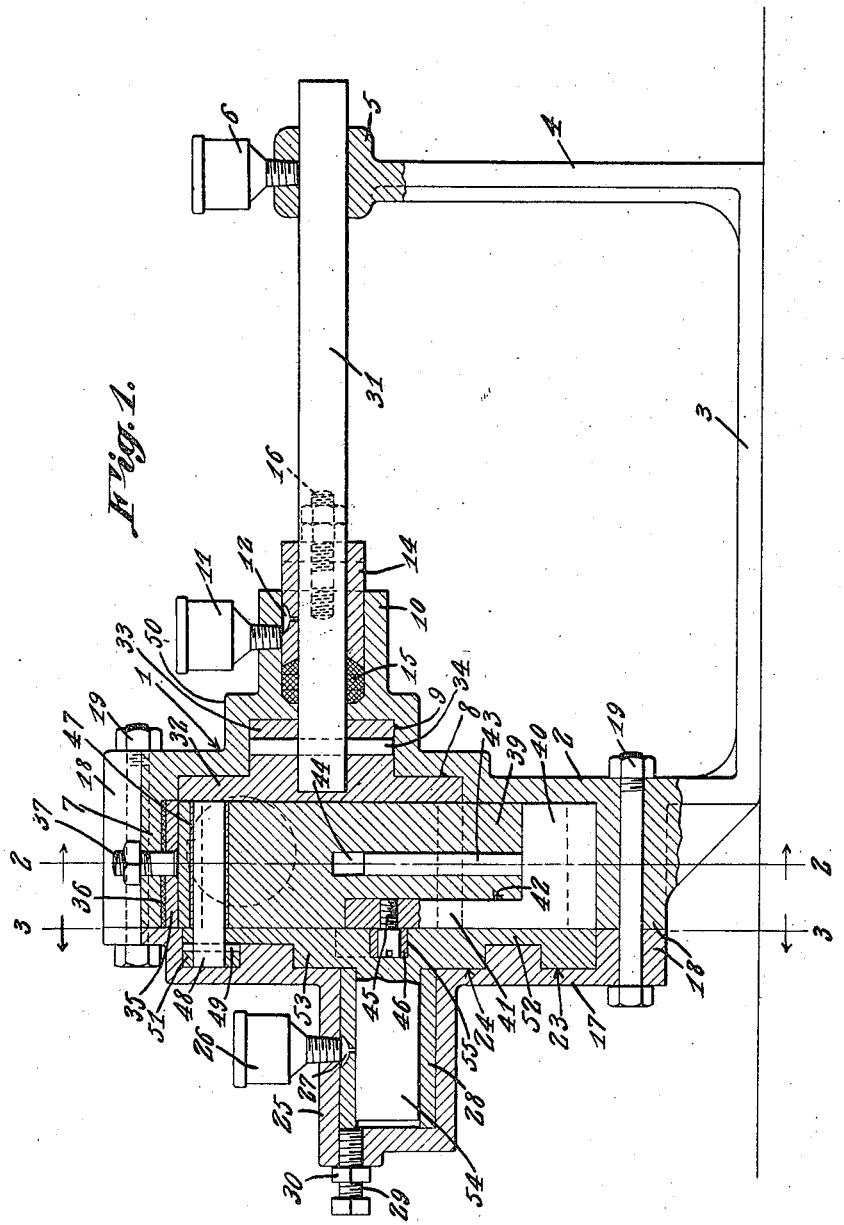

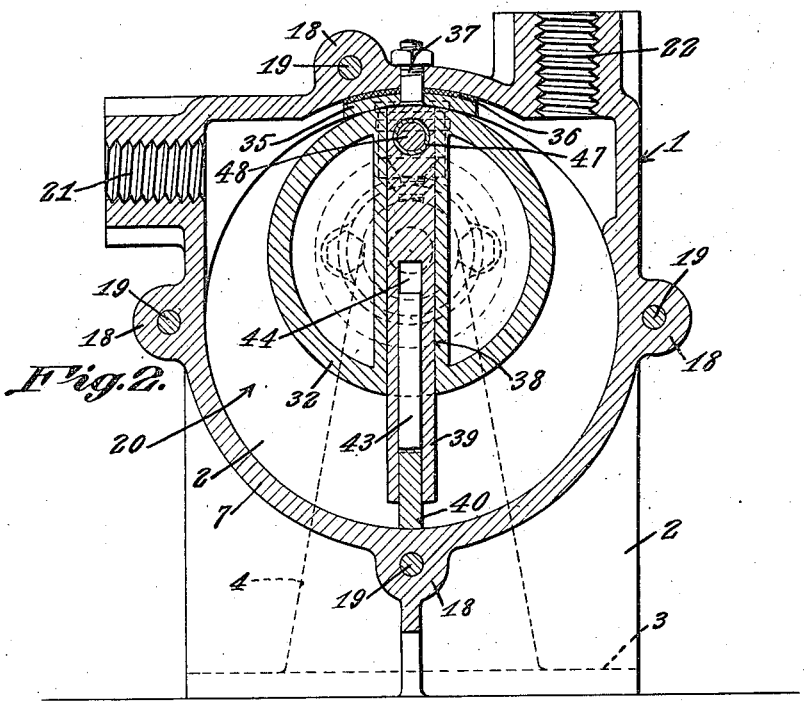
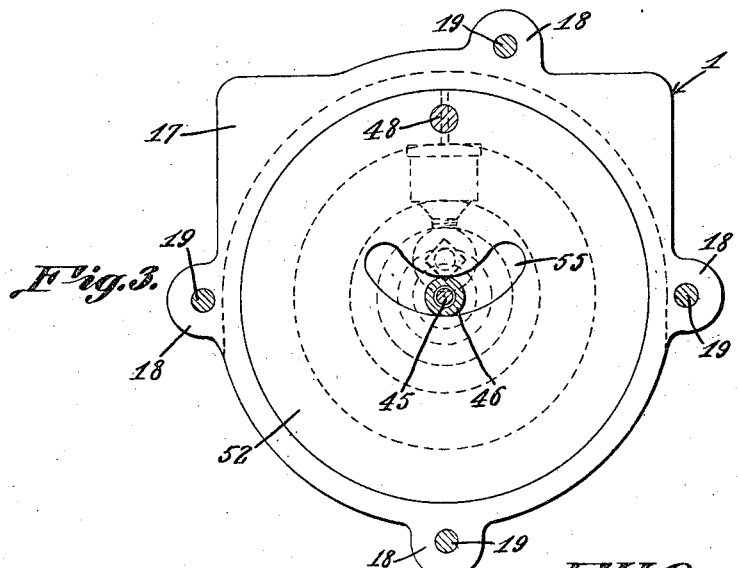

FELIX H. CRAGO, OF HOT SPRINGS, MONTANA.

PUMP.

1,322,764.  Specification of Letters Patent.  Patented Nov. 25, 1919.

Application filed July 30, 1919. Serial No. 314,266.

*To all whom it may concern:*

Be it known that I, FELIX H. CRAGO, a citizen of the United States, residing at Hot Springs, in the county of Sanders and State of Montana, have invented a new and useful Pump, of which the following is a specification.

It is one object of this invention to improve generally and to enhance the utility of pumps of that type embodying a stator, a rotor journaled in the stator, and a piston slidable in the rotor and coöperating with the stator. Specifically, the invention aims to provide novel means for advancing the blade portion of the piston, automatically, to cause the blade portion of the piston to coöperate with the stator, thereby conpensating for wear.

Other and further objects of the invention will be made manifest as the description progresses.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the drawings:—

Figure 1 is a sectional view disclosing a pump embodying the invention, the cutting plane being coincident with the axis of rotation of the rotor, parts remaining in elevation; Fig. 2 is a section on the line 2—2 of Fig. 1; Fig. 3 is a section on the line 3—3 of Fig. 1.

In carrying out the invention there is provided a stator, denoted generally by the numeral 1, the stator including a side plate 2 carried by a base 3 having a standard 4 provided with a bearing 5 carrying an oil cup 6. The side plate 2 carries a ring 7. A first recess 8 is fashioned in the side plate 2, the recess 8 communicating with a recess 9 of less diameter than the recess 8, the recess 9 being formed in a hub 50, constituting a part of the side plate 2. A sleeve 10 projects from the hub 50 and carries an oil cup 11 discharging into an oil duct 12 formed in a bearing 14 engaging a packing 15 located within the sleeve 10, the bearing 14 being connected with some part of the side plate 2 by means of securing devices 16, the parts 16, 15 and 14 constituting nothing more or less than a common gland.

The stator 1 embodies a side plate 17, this plate and the plate 2 being provided with coöperating bosses 18 receiving securing elements 19 whereby the side plate 17 is bound against the edge of the ring portion 7 of the plate 2, the parts 17, 2 and 7 defining a chamber 20. The ring portion 7 of the stator is supplied with ports 21 and 22 communicating with the chamber 20.

Near to its periphery, the side plate 17 is provided with an internal annular groove 23, and there is a recess 24 in the plate 17, adjacent to the center thereof. The side plate 17 carries an outwardly projecting sleeve 25 supplied with an oil cup 26 discharging into a duct 27 formed in a bushing 28 located within the sleeve. A screw 29 is threaded into the end of the sleeve 25 and engages the bushing 28, for the purpose of advancing the bushing and taking up end wear, the screw being held in place, after adjustment, through the instrumentality of a lock nut 30.

A drive shaft 31 is journaled for rotation in the bearing 5 and in the bearing 14. A rotor 32 is located within the stator 1 and includes a hub 33 received for rotation in the hub 50 of the side plate 2. The inner end of the drive shaft 31 enters the hub 33 of the rotor 32 and is held therein by a transverse securing member 34, mounted in the hub 33 and held against endwise movement by the part 50 of the plate 2. An abutment 35 coöperates with the uppermost portion of the rotor 32 and is held on the uppermost portion of the ring 7 of the stator by a tightening device 37 which may be a bolt and nut, a compressible packing 36 being interposed between the abutment 35 and the ring 7 of the stator. Obviously, by adjusting the tightening device 37, a proper coöperation between the abutment 35 and the rotor 35 may be obtained.

The rotor 32 is supplied with a transverse guideway 38 wherein a piston plate 39 is mounted for right line reciprocation. A blade 40 is slidably mounted in the outer end of the plate 39 and has a side arm 41 disposed radially of the rotor 32 and mounted to slide in a recess 42 fashioned in the piston plate 39 at one edge thereof. A guide pin 43 projects from the inner edge of the blade 40 and is slidably received in a correspondingly shaped opening 44 in the piston plate 39. A screw 45 or the like is mounted in the arm 41 of the blade 40 and carries a roller 46. The screw 45 and the roller 46 may be denominated a projection on the arm 41 of the blade 40.

A bushing 47 is mounted in the piston plate 39 near one end thereof, and in this bushing is received a pivot pin 48 secured by a pin 49 to an annular rib 51 on a rotary member 52, in the form of a plate, the rotary member or plate 52 coöperating with the plate 17 of the stator 1. The rib 51 on the rotary member 52 is received in the annular groove 23 of the side plate 17. The rotary member 52 embodies a hub 53 journaled in the recess 24 of the plate 17. A shaft 54 projects from the hub 53 and is mounted to rotate in the bushing 28, the inner end of the bushing abutting against the hub 53. The rotary member 52 is equipped with a curved cam slot 55, receiving the roller 46 which constitutes a part of the projection on the arm 41 of the blade 40. It is to be observed that the axes of the shafts 54 and 31 and, consequently, the axes of rotation of the rotor 32 and of the rotary member or plate 52 are offset with respect to each other and are non-alined.

When the shaft 31 is power-driven, the rotor 32 will be turned about an axis represented by the axis of the shaft 31. Rotation will be imparted to the rotary member or plate 52 through the instrumentality of the pivot pin 48 which is carried by the member 52 and is rotatably received in the piston plate 39, the member 52 turning about an axis coincident with the axis of the shaft 54, it being recalled that the axes of the shafts 54 and 31 are disposed out of alinement. Because the axes of the shafts 54 and 31 are disposed out of alinement, a right line sliding movement will be imparted to the piston plate 39 and to the blade 40 when the rotor 32 is operated, the piston plate sliding in the rotor, and the blade following the wall of the chamber 20, liquid being drawn through one of the ports 22 and being discharged through the other of the ports 22, depending upon the direction in which the member 32 is rotated. Under the back pressure of liquid on the blade 40, the roller 46 may move a short distance in the cam slot 55 of the plate 52, and thus the edge of the blade 40 is pressed continuously against the wall of the chamber 20, wear being taken up, and a liquid-tight joint being effected at a point where such a joint is necessary.

Having thus described the invention, what is claimed is:—

1. A pump comprising a stator; a rotor and a rotary member journaled in the stator on relatively offset axes; a piston slidable in the rotor and pivoted to the rotary member; a blade slidable in the piston and coacting with the stator; and interengaging elements on the blade and on the rotary member for advancing the blade toward the stator.

2. A pump comprising a stator; a rotor and a rotary member journaled in the stator on relatively offset axes, the rotary member being provided with a cam; a piston slidable in the rotor and pivoted to the rotary member; and a blade slidable in the piston, the blade being provided with a projection coöperating with the cam to advance the blade with respect to the stator.

In testimony that I claim the foregoing as my own, I have hereto affixed my signature in the presence of two witnesses.

FELIX H. CRAGO.

Witnesses:
B. F. MAIDEN,
MARIE BOCKWAN.